United States Patent
Maloof et al.

(10) Patent No.: US 6,910,827 B2
(45) Date of Patent: Jun. 28, 2005

(54) FLAT SHAFT RETAINER

(75) Inventors: Alberto Carrillo Maloof, Chihuahua (MX); Gustavo Del Campo Gonzalez, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/391,106

(22) Filed: Mar. 18, 2003

(65) Prior Publication Data

US 2004/0184873 A1 Sep. 23, 2004

(51) Int. Cl.[7] ................................................. B25G 3/00
(52) U.S. Cl. ...................... 403/319; 403/315; 403/326; 403/329; 403/374.1; 74/502; 74/503; 24/607; 24/614
(58) Field of Search ................................. 403/315, 316, 403/319, 326, 329, 374.1; 74/502, 503, 553; 24/606, 607, 614, 615

(56) References Cited

U.S. PATENT DOCUMENTS

| | | | | |
|---|---|---|---|---|
| 2,154,537 A | * | 4/1939 | Stenberg | ..................... 74/548 |
| 2,718,417 A | * | 9/1955 | Hansen | ....................... 403/329 |
| 3,468,568 A | * | 9/1969 | Ulich | .......................... 403/329 |
| 3,709,531 A | * | 1/1973 | Beehler | ...................... 403/372 |
| 6,390,925 B1 | | 5/2002 | Perrow | |

* cited by examiner

*Primary Examiner*—Daniel P. Stodola
*Assistant Examiner*—Michael P. Ferguson
(74) *Attorney, Agent, or Firm*—Stefan V. Chmielewski

(57) ABSTRACT

A knob retainer system including a knob having a cavity and an opening into said cavity and a retainer adapted to fit within the knob cavity. The retainer includes wing portions and a cantilevered barbed portion. When the retainer is placed inside of the knob cavity and the actuating lever is manipulated between the retainer and an upper wall of the knob cavity, the actuating lever downwardly depresses the retainer thereby causing stakes located in the retainer to positively engage a portion of the cavity wall thereby preventing the retainer from moving with respect to the knob. The retainer is also fitted with a cantilevered portion which terminates in a barbed end. The barbed end positively engages an engagement surface on the actuating lever thereby preventing the actuating lever from pulling away from the knob/retainer assembly. The actuating lever is easily removed from the knob/retainer assembly by use of a specialized tool.

1 Claim, 2 Drawing Sheets

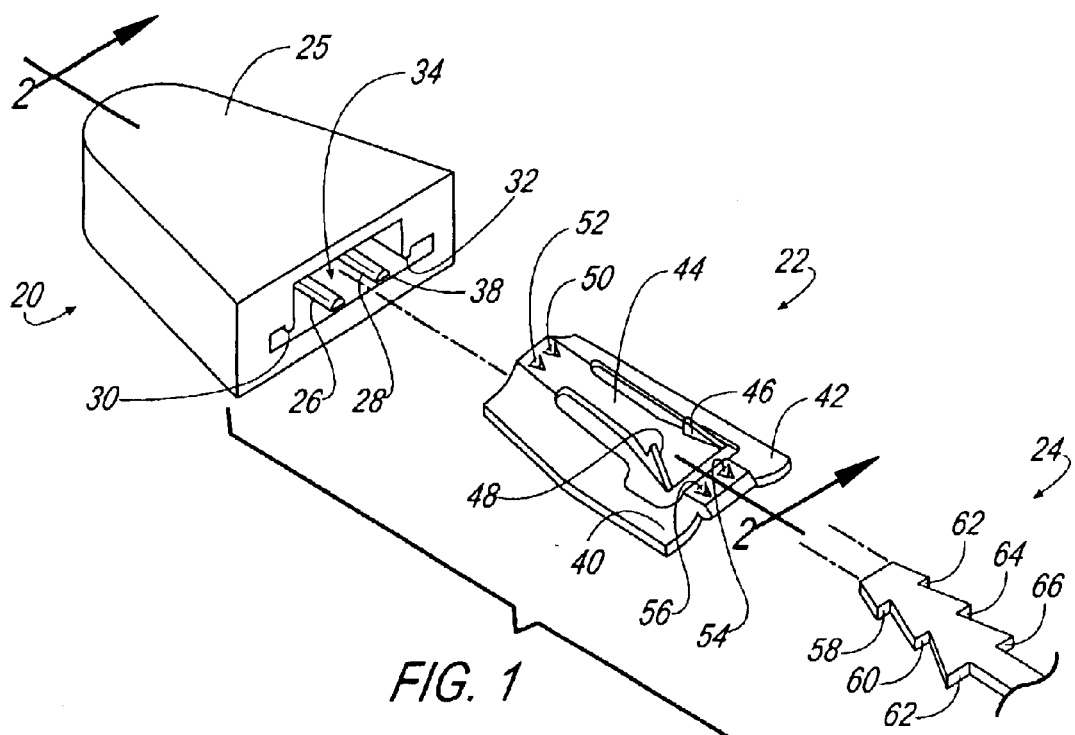
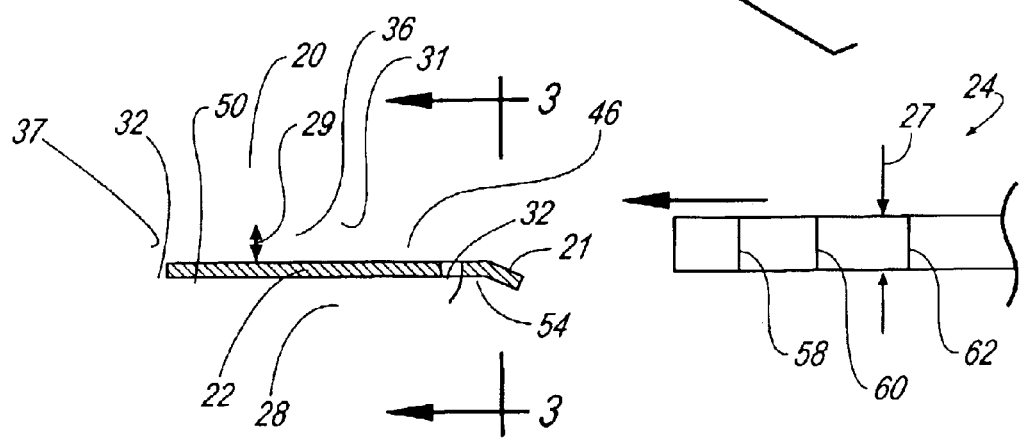
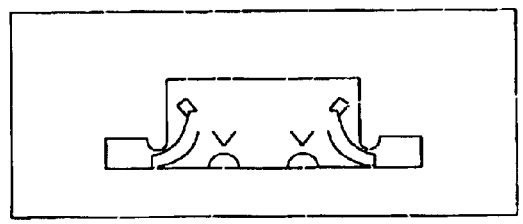

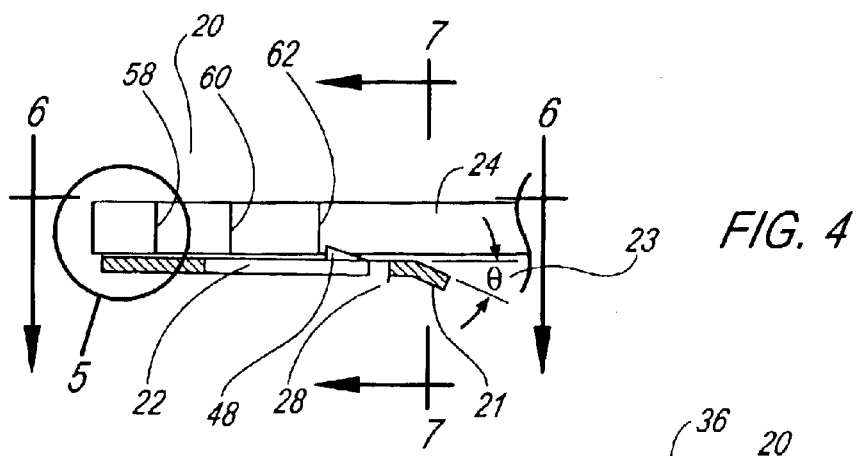
FIG. 4
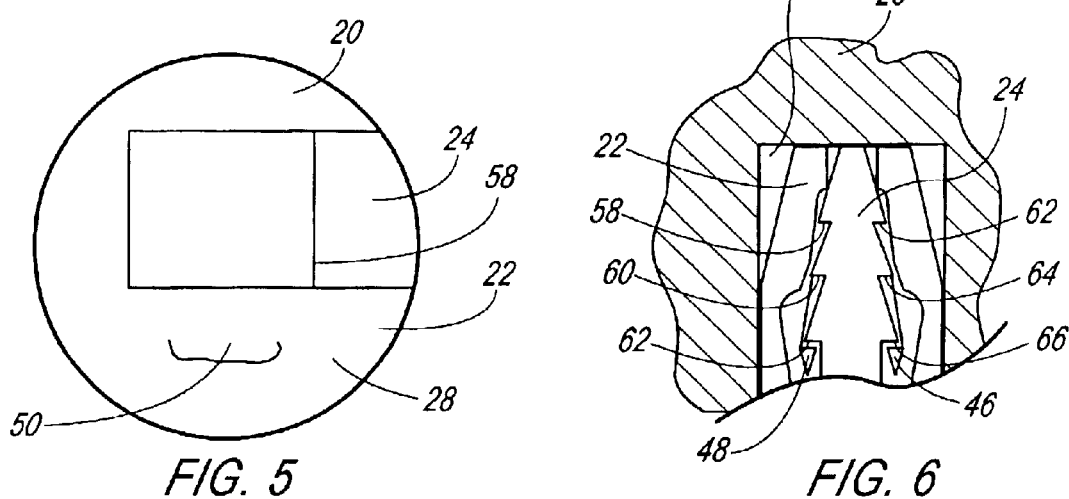
FIG. 5
FIG. 6
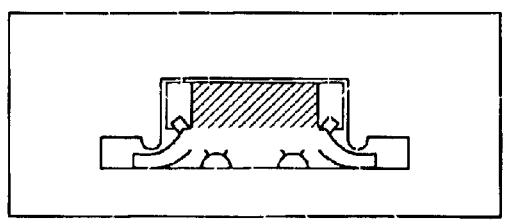
FIG. 7
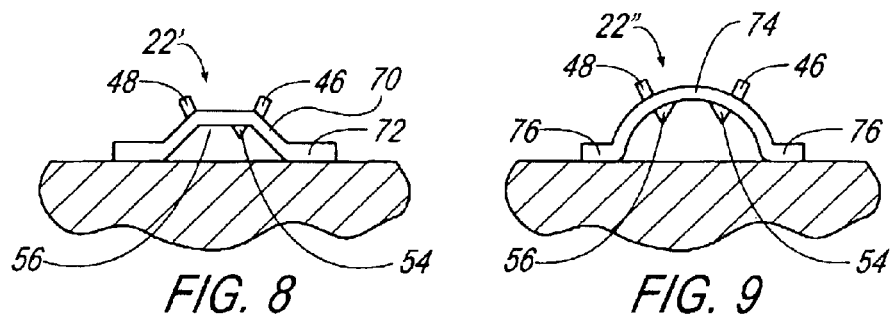
FIG. 8
FIG. 9

FLAT SHAFT RETAINER

TECHNICAL FIELD

The present invention generally relates to actuation levers and more particularly relates to systems for securing a control knob to an associated actuation lever.

BACKGROUND OF THE INVENTION

Actuation levers that include a lever and a knob secured thereto are well known in the art. Many manufacturers or designers of knobs/actuation lever assemblies, typically require that the knob installation force (i.e. the force required to seat the knob onto the lever) be small enough to manually install a knob without the aid of a force multiplier tool (such as a press, or the like). Similarly, the knob removal force (the force required to separate a knob from its associated actuation lever), is typically required to be large enough to prevent inadvertent removal of the knob during use. Forty Newtons of force or greater is a typical removal force value.

One means of securing a knob to an associated lever includes the use of adhesives to chemically bond the knob to its mating actuation lever. The pre-cured properties of most adhesives permit the knob to be installed onto its associated actuation lever with minimum force. Moreover, the retaining force of cured adhesive readily satisfies the typical removal force requirements. However, application of an adhesive can be costly, especially when the dispensing equipment and labor are considered. Further, the adhesive application process is vulnerable to operator errors (e.g. dispensing too much, or not enough, adhesive). In addition to these drawbacks, the use of an adhesive does not allow the knob to be separated from its associated actuation lever for the purpose of servicing either the knob or the lever, or the component associated with the actuation lever.

Another well-known means of securing a knob to an associated actuation lever includes the use of a mechanical interference fit between the knob and the lever. In this design approach, one end of the lever is typically slightly larger in geometry than the geometry of an associated knob cavity into which the lever is inserted. This relative sizing of the knob cavity and the actuation lever creates frictional interference between the surfaces of the two mating parts. While the use of an interference fit to secure a knob to an actuating lever overcomes the shortcomings of using an adhesive, it does not readily satisfy the above-specified installation and removal force requirements simultaneously. In other words, there are many interference fits that readily meet the specified maximum value but necessitate the use of a force multiplier tool for installation. Likewise, knob and mating actuating levers can be readily designed to meet the minimum installation force but in turn fail to meet the force removal requirement.

BRIEF DESCRIPTION OF THE DRAWINGS

FIG. 1 is an exploded view of an embodiment of the knob retention system of the present invention.

FIG. 2 is a cross sectional view of the knob retainer assembly taken substantially through lines 2—2 of FIG. 1.

FIG. 3 is a rear elevational view taken substantially along lines 3—3 of FIG. 2.

FIG. 4 is a front elevational view of the knob, retainer, and actuating lever assembly wherein the knob is shown in cross section, the retainer is shown in partial cross section, and the actuating lever is not cross sectioned.

FIG. 5 is an enlarged view of encircled portion 5 of FIG. 4.

FIG. 6 is a partial cross sectional view taken substantially along lines 6—6 of FIG. 4.

FIG. 7 is a cross sectional view taken substantially through lines 7—7 of FIG. 4.

FIGS. 8 and 9 depict rear elevational views of two alternative embodiments of the flat shaft retainer.

DETAILED DESCRIPTION OF THE PREFERRED EMBODIMENTS

Structure

FIG. 1 depicts the structure of knob retainer system of the present invention. The knob retainer system includes knob 20 which is coupled to actuating lever 24 by way of flat shaft retainer 22. Actuating lever 24 can be a subcomponent of any type of device which must be set by an operator. Such devices are commonly in the dash panel of a vehicle. Such devices typically include, but are not limited to, vehicle climate control units, radios, and the like.

Now referring to FIGS. 1 and 2, knob 20 includes cavity 36 which terminates into opening 34. The sidewalls of cavity 36 include pre-load lobes 30,32. Cavity 36 also includes floor surface 38 which supports anchor ribs 26, and 28. Anchor ribs 26, 28 are preferably raised above floor surface 38, and are generally formed parallel to longitudinal axis 25 of knob cavity 36. Pre-load lobes 30,32 preferably extend parallel to longitudinal axis 25 of knob cavity 36.

Flat shaft retainer (hereinafter "retainer") 22 includes wing portions 40,42; anchor stakes 50,52,54 and 56; and cantilevered arm 44. Cantilevered arm 44 terminates into barbed ends 46,48. Because of the various functions carried out by flat shaft retainer 22, it is preferably fabricated from stamped steel wherein the steel property has sufficient "springiness" to allow wings 40,42 and cantilevered arm 44 to resiliently spring back from a deflected position. Steel compositions providing this "springiness" function are well known to those skilled in the art and such steel is generally known as spring steel.

Actuating lever 24 is generally flat in cross section and includes a plurality of barb engagement surfaces 58 through 66.

Assembly

The process for attaching knob 20 to actuating lever 24 is as follows. Firstly, flat shaft retainer 22 is slid into knob cavity 36 by way of knob opening 34. Once retainer 22 is fully seated in cavity 36 it will assume the position shown in FIGS. 2 and 3. As best shown in FIG. 3, pre-load lobes 30,32 cooperate with retainer wings 40,42 such that an interference fit, or friction fit, is established. This friction fit prevents retainer 22 from falling out of 36 during the assembly process. Next, actuating lever 24 is slid into knob opening 34 and pushed all the way into cavity 36 until it bottoms against end wall 37 of cavity 36. Because thickness 27 of actuating lever 24 is greater than the distance 29 between the top of retainer 22 and the ceiling 31 of cavity 36, the retainer is forced downward causing wings 40 to spread outwardly. (To view the spread of wings 40,42, contrast the position of wings 40,42 in FIG. 3 to that shown in FIG. 7). When retainer 22 moves downwardly, anchor barbs 50 through 54 likewise move downwardly and penetrate their respective anchor ribs 26,28. In FIG. 5, an enlarged view is shown of anchor stake 50 penetrating its respectively associated rib 28. It can be appreciated that, with the penetration of stakes 50 through 56 into their respective anchor ribs 26,28, flat shaft retainer 22 cannot be easily pulled from cavity 36. Cantilevered arm 44 is preferably furnished with guide lip 21 which terminates in a downward angle 23 (see FIG. 4). This downward angle of guide lip 21 facilitates the initial alignment, engagement, and insertion of actuating lever 24 into opening 34.

During the process of inserting actuating lever 24 into cavity 36, barbs 46,48 deflect downwardly (due to the force exerted on them actuating lever 24 passes over them) thereby allowing actuating lever 24 to freely pass over them. However, once anchoring lever 24 is fully seated against end wall 37 of cavity 36, barbed ends 46,48 will assume the position shown in FIG. 4. Specifically, barb 48 will reside above the bottom plane of actuating lever 24 such that it interferes with, and prevents the rearward movement of actuating lever 24 by virtue of catching actuating lever 24 along barbed engagement surface 62. Likewise, barb 46 catches actuating lever 24 along barb engagement surface 66 and thereby prevents actuating lever 24 from being retracted from cavity 36. FIG. 4 and FIG. 6 show the interference of barbs 46,48 with their respective barb engagement surfaces 66,62 of actuating lever 24.

FIG. 8 shows a second embodiment of the flat shaft retainer of the present invention. In this second embodiment, the leg sections are not generally concave (as shown in the retainer embodiment set forth in FIGS. 1–7), but rather each leg portion is generally comprised of first and second linear segments 70,72 respectively. The flat shaft retainer embodiment 22" shown in FIG. 9 discloses a flat shaft retainer having a generally semi-circular body portion 74 which terminates into a pair of horizontally disposed feet sections 76.

The retainer system of the present invention has shown that it can easily provide retention forces much greater than 40 Newtons of force. It is also easier to automate than prior art systems using adhesives to join the knob with the actuating lever. Also, it offers flexibility in service in that the knob is easily removed from the actuating lever by virtue of sliding a small wedging tool between an upper surface of cantilevered arm 44 and the bottom of actuating lever 24 and downwardly cantilevered arm 44 downwardly until barbs 46,48 disengage from their respectively associated barb engagement surfaces 66,62 of actuating lever 24.

It is understood that various modifications or additions may be made to the preferred embodiments chosen here to illustrate the present invention, without departing from the spirit of the present invention. For example, although the preferred embodiment of retainer 22 is fabricated from spring steel, other materials, such as plastics or the like may offer less expensive, alternatives while providing comparable functionality. Accordingly, it is to be understood that the subject matter sought to be afforded protection hereby shall be deemed to extend to the subject matter defined in the appended claims, including all fair equivalents thereof.

REFERENCE NUMBERALS 20 knob
21 guide lip of 22
22 flat shaft retainer
23 angle of guide lip 21
24 actuating lever
25 longitudinal axis
26 anchor ribs
27 thickness of 24
28 anchor ribs
29 cavity above 22
30 pre-load lobe
31 ceiling of 36
32 pre-load lobe
34 knob opening
36 knob cavity
37 end wall of 36
38 knob cavity floor
40 flat shaft retainer wing
42 flat shaft retainer wing
44 cantilevered arm
46 barbed end
48 barbed end
50 anchor stake
52 anchor stake
54 anchor stake
56 anchor stake
58 barb engagement surface
60 barb engagement surface
62 barb engagement surface
64 barb engagement surface
66 barb engagement surface
68 barb engagement surface
70 first linear segment
72 second linear segment
74 semi circular body portion of 22"
76 horizontally disposed feet sections of 22"

What is claimed is:

1. In combination, an actuating lever formed of a flat shaft and having a central axis, said actuating lever comprising a plurality of barb engagement surfaces extending laterally to the central axis, a knob defining a cavity having an opening for axially receiving the actuating lever, and a retainer disposed within the cavity for retaining the actuating lever therein, said retainer comprising a body comprising stakes and wings extending laterally relative to the body for supporting the body within the cavity and adapted to springingly deflect in response to axial insertion of the actuating lever to cause the stakes to engage the cavity surface, thereby securing the retainer within the cavity, said retainer further comprising a cantilever arm attached to the body at one end and extending axially to a front end adjacent the opening and adapted to springingly deflect in response to axial insertion of the actuating lever into the cavity, said cantilever arm further comprising barbs for engaging the barb engagement surfaces of the actuating lever to retain the actuating lever within the cavity.

* * * * *